(12) United States Patent
Schwesig

(10) Patent No.: US 8,191,399 B2
(45) Date of Patent: Jun. 5, 2012

(54) MONITORING DEVICE AND MONITORING METHOD FOR A DRIVE DEVICE

(75) Inventor: Günter Schwesig, Erlangen (DE)

(73) Assignee: Siemens Aktiengesellschaft, München (DE)

(*) Notice: Subject to any disclaimer, the term of this patent is extended or adjusted under 35 U.S.C. 154(b) by 617 days.

(21) Appl. No.: 12/086,105

(22) PCT Filed: Nov. 16, 2006

(86) PCT No.: PCT/EP2006/068584
§ 371 (c)(1),
(2), (4) Date: Jun. 5, 2008

(87) PCT Pub. No.: WO2007/068550
PCT Pub. Date: Jun. 21, 2007

(65) Prior Publication Data
US 2009/0277289 A1    Nov. 12, 2009

(30) Foreign Application Priority Data

Dec. 16, 2005  (DE) .......................... 10 2005 060 352
Sep. 29, 2006  (DE) .......................... 10 2006 046 283
Sep. 29, 2006  (DE) .......................... 10 2006 046 286

(51) Int. Cl.
*G01P 21/00* (2006.01)

(52) U.S. Cl. .......................... 73/1.37; 73/1.75; 73/1.79

(58) Field of Classification Search ............ 73/1.75, 73/1.79, 1.37
See application file for complete search history.

(56) References Cited

U.S. PATENT DOCUMENTS

| | | | | |
|---|---|---|---|---|
| 3,307,172 A | * | 2/1967 | Kolb | 73/1.75 |
| 3,915,271 A | * | 10/1975 | Harper | 477/5 |
| 4,115,958 A | | 9/1978 | Englander et al. | |
| 4,524,313 A | | 6/1985 | Kuno et al. | |
| 4,608,797 A | | 9/1986 | Shabram, Jr. et al. | |
| 4,656,990 A | * | 4/1987 | Miyaki et al. | 123/494 |
| 4,807,153 A | | 2/1989 | Onaga et al. | |
| 5,285,691 A | * | 2/1994 | Baer | 73/862.325 |
| 5,668,445 A | * | 9/1997 | Matsui | 315/241 P |
| 5,675,095 A | * | 10/1997 | Ballantyne | 73/862.325 |
| 6,071,477 A | | 6/2000 | Auclair et al. | |
| 6,104,185 A | * | 8/2000 | Lamm et al. | 324/207.2 |
| 6,494,046 B1 | | 12/2002 | Hayess | |

(Continued)

FOREIGN PATENT DOCUMENTS

DE    11 32 803    11/1958

(Continued)

OTHER PUBLICATIONS

Translation FR 2285745.*

(Continued)

*Primary Examiner* — Hezron E Williams
*Assistant Examiner* — Nashmiya Fayyaz

(57) ABSTRACT

There is described a method for monitoring a drive device for a defective sensor signal from a first sensor of the drive device and to a monitoring device which is suitable for this purpose. Although sensors operate reliably, sensor errors which may give rise to significant damage if they are not detected may arise. Monitoring the sensor makes it possible to increase the reliability of the drive device. The sensor signal from the first sensor is compared with a sensor signal from a second sensor in such a manner that the first sensor is monitored. In this case, the monitoring device is intended, in particular, for a sensor having a sensor disc.

5 Claims, 2 Drawing Sheets

U.S. PATENT DOCUMENTS

| | | | |
|---|---|---|---|
| 6,898,859 B2 | 5/2005 | Taniguchi et al. | |
| 7,026,734 B2 | 4/2006 | Braun | |
| 7,251,575 B2 | 7/2007 | Hiller | |
| 7,650,786 B2 * | 1/2010 | Kabatzke | 73/510 |
| 2001/0011698 A1 | 8/2001 | Kieselbach | |

FOREIGN PATENT DOCUMENTS

| | | |
|---|---|---|
| DE | 24 48 239 | 4/1976 |
| DE | 2541797 A * | 4/1976 |
| DE | 3726148 A1 | 2/1989 |
| DE | 9016232 U1 | 5/1991 |
| DE | 19520299 A1 | 12/1996 |
| DE | 19857552 A1 | 6/2000 |
| DE | 20122389 U1 | 7/2005 |
| EP | 0 658 832 A2 | 6/1995 |
| EP | 0867543 A2 | 9/1998 |
| EP | 0964126 A2 | 12/1999 |
| EP | 1116954 B1 | 7/2001 |
| EP | 1305642 B1 | 5/2003 |
| EP | 1377838 B1 | 1/2004 |
| EP | 1427499 B1 | 6/2004 |
| EP | 1477817 A1 | 11/2004 |
| EP | 1503215 A1 | 2/2005 |
| EP | 0834056 B1 | 3/2005 |
| EP | 1538423 A2 | 6/2005 |
| EP | 1606590 B1 | 12/2005 |
| JP | 57116209 A | 7/1982 |
| JP | 62-017615 A | 1/1987 |
| JP | 05-157584 A | 6/1993 |
| JP | 2001-504924 A | 4/2001 |
| JP | 2002-081961 A | 3/2002 |

OTHER PUBLICATIONS

Wilhelmy et al., "Antriebe sicher überwacht", Sensor-Kombinationen für die Antriebstechnik, in propulsion technology 43 (2004), pastboard binding, pp. 1-3, Nr.6, http://www.baumerhuebner.com/uploads/media/artikel_kombinationen_2004_dt.pdf.

Company leaflet, "Kombinationen, Informationen für den Anwender", Bonner Elektromaschinen AG Berlin, pp. 1-24.

Data sheet, "TDP 02 + OG 60, Hübner Combination", Hübner Elektromaschinen AG Berlin, Analog-Tacho+Digital-Tacho LongLife DC Tachogenerator+Encoder.

Professional article, "Ausbau und Weiterentwicklung computergestützter Prüftechnik", Apr. 2004, pp. 1-7, Propulsion Technology.

"Prüfvielfalt beherrschen" Computergestützte Prüftechnik für die Industriegetriebeentwicklung, veröffentlicht in Antriebstechnik 43, 2004, pp. 46-49, Exercise book 4, Propulsion Technology.

"Sensorik, Systemkommunikation und Steuerungstechnik für die Automatisierung", Course Materials Ecomat200, , Apr. 2003, pp. 1-55, Systems of values, http://www.ifm-electronic.com/obj/seed.pdf.

Communication from Japanese Patent Office, Feb. 17, 2012, pp. 1-4.

* cited by examiner

MONITORING DEVICE AND MONITORING METHOD FOR A DRIVE DEVICE

CROSS REFERENCE TO RELATED APPLICATIONS

This application is the US National Stage of International Application No. PCT/EP2006/068584, filed Nov. 16, 2006 and claims the benefit thereof. The International Application claims the benefits of German application No. 10 2005 060 352.1 DE filed Dec. 16, 2005, German application No. 10 2006 046 283.1 DE filed Sep. 29, 2006 and German application No. 10 2006 046 286.6 DE filed Sep. 29, 2006, all of the applications are incorporated by reference herein in their entirety.

FIELD OF INVENTION

The present invention relates to a monitoring device for a drive device for detecting faults in a sensor of the drive device. A fault of said kind can occur particularly when the drive device is at rest but also while it is traveling.

BACKGROUND OF INVENTION

There are machine parts, for example angle boards on lathes and hoisting cages in standard material handling systems, that are driven by means of standard electric drive devices and where the "hanging load" state can arise. The electric drive device therein has at least one electric machine that can be motor-operated and in particular also generator-operated. In the "hanging load" state a minimum moment must be exerted by the drive, meaning by the electric machine, in order to counteract the gravitational force pulling the load down. For that purpose the drive has, for example, a power converter for powering the electric machine. However, the electric machine can also be connected as a drive device directly to a supply voltage.

In the event of an outage or other fault in the electric drive device it will be unable to exert the requisite moment. If no further measures are taken, a hoisting cage, for instance, may drop and put persons and objects at risk.

As a safeguard against such risks, safety devices such as releasable brakes are known that will engage in the event of faults and power outages and put the hanging load into a safe state. For detecting faults of said kind it is possible to employ, for example, multi-channel, redundant safety systems and components that cause one or more safety devices to trigger. Safety devices of said kind are used advantageously not only when the drive device is at rest but also while it is operating.

The transition to the safe state can, of course, be initiated only if a fault having occurred is also detected. Depending on the specific implementation and application, the fault therein needs to be detected appropriately quickly. The implementation therein relates in particular to the mechanism of a machine, wherein, for instance, transmission ratios of gears have a possible impact.

There are faults that cannot be detected directly or whose detection would require complex additional measures. Examples of faults of this kind are:
breaking of the sensor shaft, meaning of the rotationally fixed link between the drive device and a sensor device (sensor) that registers an actual position or actual rotational speed of the drive device,
malfunctions in the sensor system itself that give rise to apparently correct signals.

Faults of said kind cannot be detected in the case of a single-channel sensor device. Sensor signals can, for example, assume a static state in the event of a fault, meaning that although the signals of the sensor are indeed correct they are following a movement of the drive device because, for instance, there is a fault in the sensor system or a fault in a coupling device between the sensor and the drive device. Breaking of a sensor shaft means, for example, that a frictional connection between a motor shaft and sensor shaft will have been lost. Apart from said possibility of a broken sensor shaft there are, though, other possibilities such as loss of the frictional connection between the sensor shaft and a code disk of the sensor. The sensor's code disk serves to generate sensor signals and is referred to frequently also as a sensor disk.

Examples of known sensors are location sensors, speed sensors, and acceleration sensors. For registering location, position, linear speed, and rotational speed, sensors can be used that generate two sinusoidal or square wave signals offset by 90°. The location or rotational speed can be determined from said signals. If said sensor signals become static or the sensor shaft breaks and the drive device, which is to say the electric motor, remains in the active idling state (moment is exerted against the force due to weight, rotational speed is zero), then the sensor signals (sensor variables) will freeze unnoticed. Location and rotational speed regulators would then be in an open loop mode. In particular a control loop for regulating location, speed and/or acceleration would hence be open, so that controlled operation is no longer possible. The drive device will then be in a labile state. The slightest disturbing moments could in the case of, for instance, hoisting gear then cause a load to be dropped.

While a machine is in operation, a drive device assigned thereto will continue being moved, for example, from one position to another. The assumed faults can therein be detected by observing certain controlled variables. As that is a very complex process and the risk that the sensor shaft will break or that the sensor signals will become static is assessed as being at most very slight, such additional measures for monitoring are frequently omitted.

U.S. Pat. No. 4,115,958 A discloses a monitoring device for a drive device which is provided for monitoring a movement of the drive device. The monitoring device has a first and a second sensor, the second sensor being provided for monitoring the first sensor.

U.S. Pat. No. 4,807,153 A discloses a monitoring device for a drive device which is provided for monitoring a movement of the drive device. The monitoring device has a sensor. The motor current and the terminal voltage of a motor of the drive device are also recorded. On the basis of the motor current, the terminal voltage and motor-specific characteristic variables (resistance and inductance), an estimated value for a motor velocity is determined so that the motor velocity determined by means of the sensor can be checked with regard to its validity.

EP 0 658 832 A discloses a sensor which supplies an incremental signal on one hand and an absolute signal on the other hand so that the two signals can be mutually checked with regard to their validity.

It is known from U.S. Pat. No. 6,071,477 A to connect a stepper motor to a driven shaft by means of a coupling. The rotary position of the shaft is sensed by means of an encoder.

SUMMARY OF INVENTION

To comply with certain safety standards it is, however, no longer adequate to assess outage risks qualitatively. An object of the present invention is therefore to disclose a monitoring device for a drive device by means of which enhanced safety can be achieved, with attention needing to be paid in particular to a simple implementation of these measures. As the probability that the sensor shaft will break or the sensor signals will become static is scarcely calculable and because having to include the sensor itself in a quantifying process is to be avoided for reasons of cost and effort, there is a need also to be able to recognize these highly improbable fault sources. What is also required, for example, by the new IEC 61508 safety standard while safety is being considered is a qualified calculation of breakdown probability which makes it necessary to assess the probability of failure quantitatively.

The object of the invention can be achieved by means of a monitoring device for a drive device for detecting an erroneous sensor signal having the features as claimed in an independent claim. The dependent claims relate to advantageous inventive developments of the invention.

The object of the invention can be also achieved by means of a monitoring device for a drive device which is provided for monitoring a movement of the drive device, wherein the monitoring device has a first sensor and a second sensor, the second sensor being provided for the purpose of monitoring the first sensor. The first sensor is mechanically coupled to a motor shaft by means of a coupling. The coupling has a driving side and a driven side. The first sensor is assigned to the driven side and the second sensor to the driving side of the coupling.

In an advantageous embodiment of the monitoring device the first sensor has a sensor disk which is coupled to a sensor shaft by means of a form-fit link. Faults due to detached connections between the sensor disk and sensor shaft, established, for example, by means only of an adhesive link, can be reduced through the embodiment of the form-fit link.

The sensor disposed on the driven side is preferably a highly accurate sensor compared with the sensor disposed on the driving side of the coupling.

To reduce the failure probability of the monitoring device it is furthermore advantageous for the driving side of the coupling to be linked to a motor shaft in a form-fit manner. Said form-fit link can be realized by means of, for instance, a slot-and-key combination.

It is also advantageous, for example, for the first and second sensor to be disposed in a common housing. The fault probability will be reduced thereby and it will require less effort to encapsulate the sensors.

BRIEF DESCRIPTION OF THE DRAWINGS

Further advantages and specifics will emerge from the following description of exemplary embodiments in conjunction with the drawings, in which.

DETAILED DESCRIPTION OF INVENTION

Figure 1:
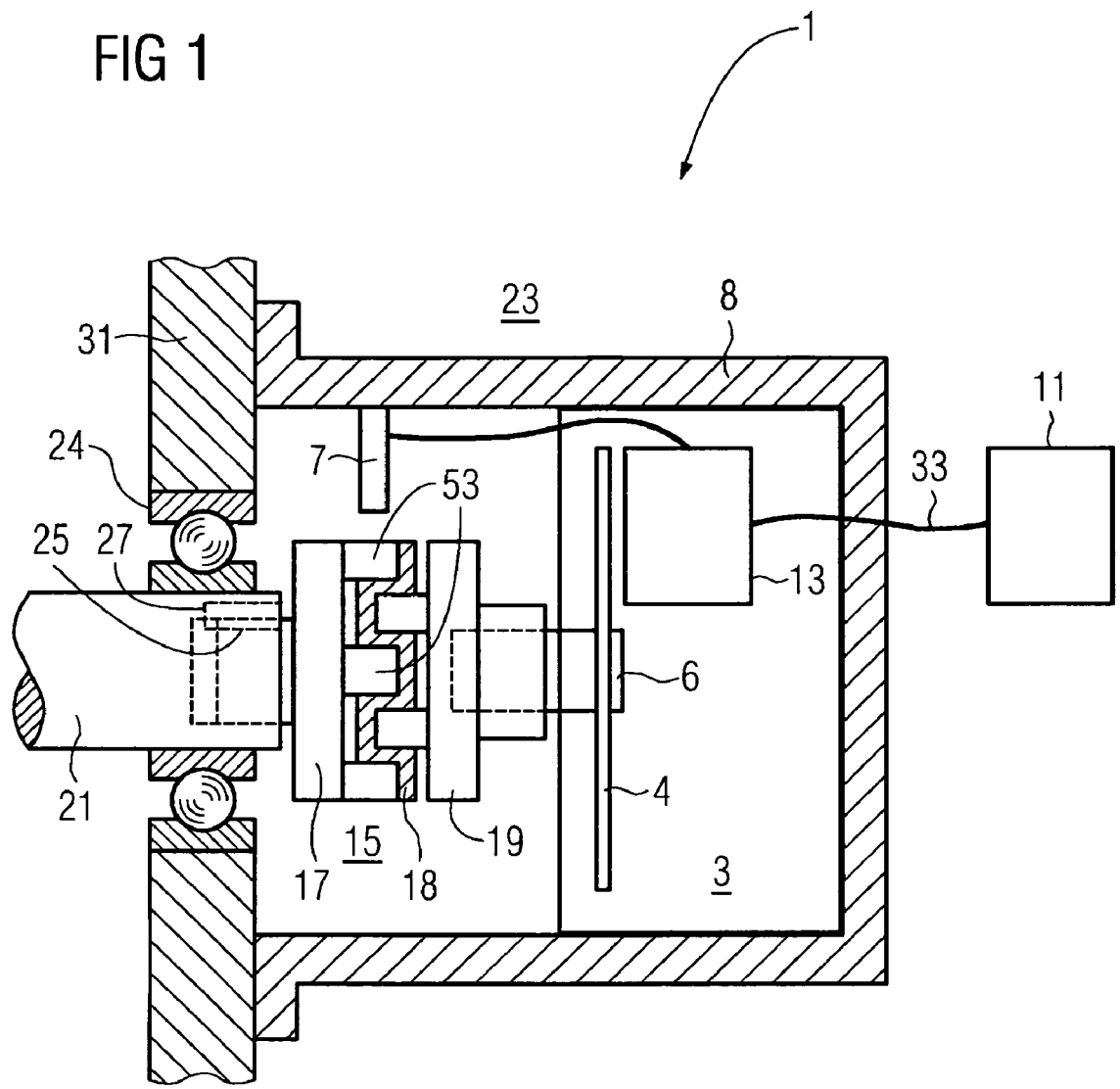
FIG. 1 schematically shows a monitoring device having two sensors.

The schematic according to FIG. 1 shows a drive device 1. The drive device 1 has an electric machine of which only the end plate 31 (end plate on the operating side of an electric machine), a bearing 24 constituting a motor bearing, and a motor shaft 21 are shown in FIG. 1. The schematic according to FIG. 1 also shows a first sensor 3 and a second sensor 7. The first sensor 3 has a sensor shaft 6, a sensor disk 4 (code disk) and a signal processing device 13. The signal processing device 13 is provided for processing the signals that can be generated by means of the code disk (sensor disk) 4. The sensor disk 4 is placed on the sensor shaft 6, the sensor shaft 6 being mechanically linked to a coupling 15. The mechanical link is, for example, a snug or press fit. The sensor disk 4 is advantageously mechanically coupled to the sensor shaft 6 by means of a form-fit link (not shown). The coupling 15 has a driving side 17 and a driven side 19. The driving side 17 and driven side 19 are mutually mechanically coupled by means of an elastic connecting part 18. The driving side 17 is the coupling part that is mechanically linked on the motor side to the motor shaft 21. A mechanical link of said type can be realized by means of, for example, a slot-and-key connection. According to the embodiment shown in FIG. 1 the slot 25 and key 27 of the slot-and-key connection can be integrated in the motor shaft 21. The driven side 19 of the coupling 15 relates to the coupling part on the sensor side. Said coupling part on the sensor side is mechanically linked to the sensor shaft 6. A rotational movement or a position of the driven part 19 of the coupling 15 can be registered by means of the first sensor 3. A movement of the coupling part on the motor side, meaning of the driving side 17 of the coupling 15, can be registered by means of the second sensor 7. That can be achieved, for example, economically by means of a magnetic sensor that detects claws of a claw coupling. The second sensor 7 advantageously has a data link to the first sensor 3. The sensor signal of the first sensor 3 can then be evaluated with reference to the sensor signal of the second sensor 7 in the signal processing device 13. An evaluation signal can be conveyed by means of, for example, a data cable 33 enabling a data link to a control and/or regulating device 11. In a further embodiment the signals of the first and second sensor 3, 7 are compared in the control and/or regulating device 11 itself, with there being a direct or indirect data link to said control and/or regulating device 11. That variant is not, though, shown explicitly in FIG. 1.

The gap that exists in the prior art in monitoring the drive device 1 can be closed and hence improved fault monitoring realized by means of a monitoring device shown for a drive device 1. That is regardless of whether an elastic coupling (for example claw coupling) or a rigid coupling to the motor shaft 21 has been realized as the coupling.

According to the prior art the sensor disk (code disk) 4 is usually glued to the sensor shaft 6. According to the invention, however, in one embodiment the sensor disk 4 is linked to the sensor shaft 6 by means of a form-fit connection, since in that way, for example, a frictional connection established between the sensor shaft 6 and sensor disk 4 can be additionally improved by way of a clamping device, a press fit or suchlike. A slot-and-key connection is an example of a form-fit link.

Three sites can advantageously be improved in terms of their fault characteristics. Those are, firstly, the link between the driving side of the coupling 15 and the motor shaft 21, secondly, the opposite driven side of the coupling 15, meaning the link between the first sensor 3 and the coupling 15, and, thirdly, the link of the sensor disk 4 with reference to the sensor shaft 6. Links of said type can advantageously be embodied by means of a form-fit connection. The use of form-fit links in said areas is independent of the use of a first and second sensor 3, 7.

According to the schematic shown in FIG. 1, only one form-fit link is provided to connect the motor shaft 21 to the driving side 17 of the coupling 15. Claws 53 of the coupling part on the driving side are additionally scanned by means of a simple magnetic sensor, in the present example the second sensor 7. Additional position signals arise as a result. Regarding the position at which said signals are generated there is an expectation in terms of the position generated in the first sensor 3. If the expectation is not met, it means there is a fault in the form of, for example, a broken sensor shaft or sensor signal that has become static. Whether the expectation has been met can be checked either in the electronics of the first sensor 3, meaning in the signal processing device 13, or in the control and/or regulating device 11. The control and/or regulating device 11 is provided for, for example, regulating the rotational speed or position of the electric machine. The sensor signals can also be checked in the moving state. Depending on how the arrangement has been specifically implemented, a fault will be detected after one revolution at the latest.

It is advantageous to use only a simple additional sensor as the second sensor 7 because account can then be taken both of the requirement for monitoring and of the requirement for a simple structure. Said second sensor 7 can advantageously be embodied such that it only has to supply one signal per revolution. It is not in all cases necessary to detect the direction of rotation. A change of slope will basically suffice for detecting a fault.

In an advantageous embodiment of the invention the second sensor 7 scans a mechanical part that is already present. That is so in the case of, for instance, a coupling 15 that has claws 53. The claws 53 are advantageously linked to the motor shaft 21 in a form-fit manner, or the motor shaft 21 has contours that can be detected and scanned by means of the second sensor 7. A form-fit link between the driving side 17 of the coupling 15 and the motor shaft 21 will not be necessary if the motor shaft 21 is scanned by the second sensor 7 precisely because the motor shaft 21 itself will be scanned by the second sensor 7. Although not shown in FIG. 1, that embodiment variant is easy to understand because appropriate contours in the motor shaft 21 can easily be realized by means of furrows or grooves.

In a further embodiment variant (not shown) the second sensor 7 is integrated in the electric machine itself. That means that the second sensor 7 is located not, as shown, in the sensor housing 8, and so subsumed on the driven side in terms of the end plate 31, but in the housing of the electric machine, with a part of the housing of the electric machine being embodied by the end plate 31.

According to the invention a capacitively, inductively, optically, magnetically, etc. operating sensor can be used as the sensor. Wherever the second sensor 7 is positioned in or on the electric machine, it must be insured that it is mounted on a part of the electric machine that has a secure mechanical link to the motor shaft 21.

Figure 2:
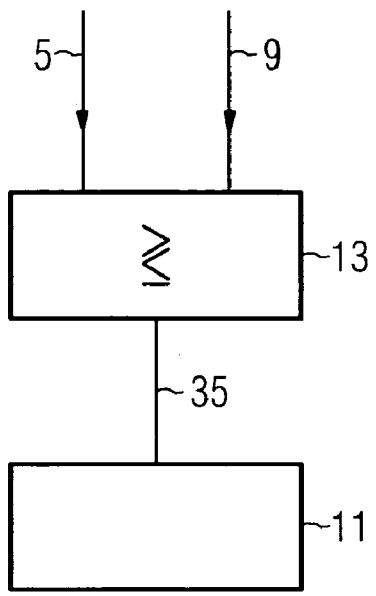
FIG. 2 schematically shows a signal flow in the case of a monitoring method for monitoring an erroneous sensor signal of a drive device, and FIG. 3 schematically shows an exemplary application for a drive device.

The schematic according to FIG. 2 shows a signal flow of the sensor signals 5 and 9 generated by the first sensor 3 and second sensor 7 respectively. The sensor signal 5 generated by the first sensor 3 is compared in the signal processing device 13 with the sensor signal 9 generated by the second sensor 7. If a differential value of the signals 5, 9 exceeds a certain threshold, for example, a fault signal 35 can be forwarded to the control and/or regulating device 11. The comparison can advantageously be performed also within the control and/or regulating device 11 itself if the sensor signals 5 and 9 are conveyed directly to the control and/or regulating device 1. That is not, though, shown in FIG. 2. It is possible depending on the generation of a fault signal 35 to apply a brake, for example, or a pulse inhibitor in the case of a power converter.

Figure 3:
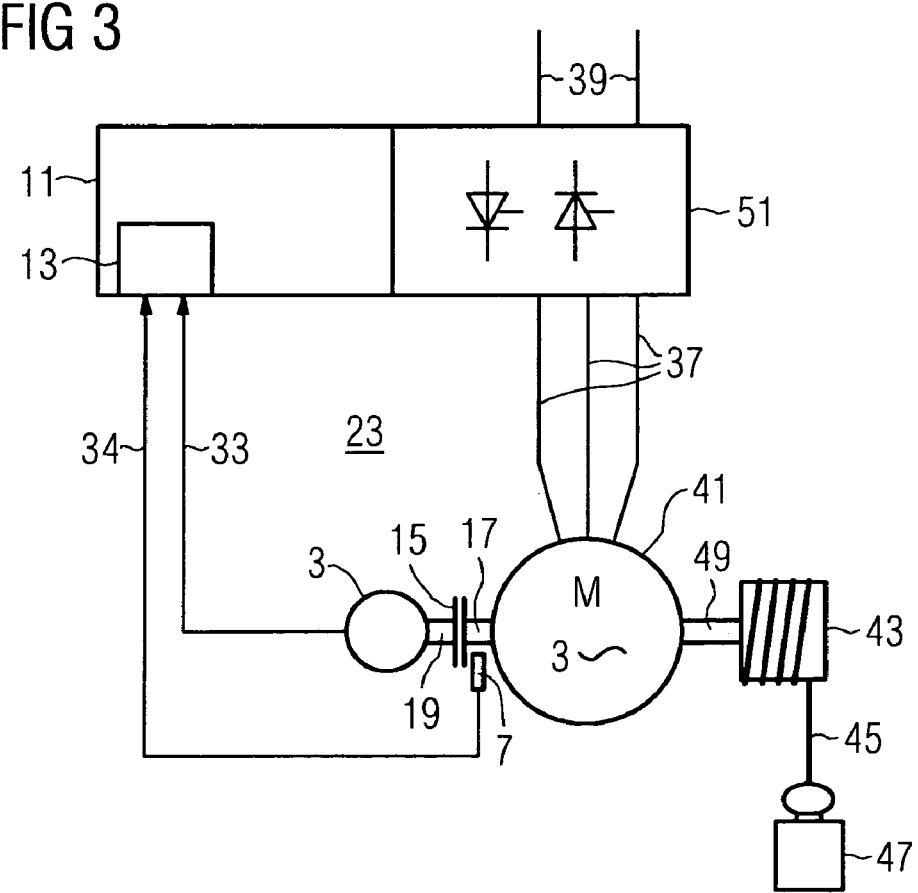

The schematic according to FIG. 3 shows an exemplary application for a drive device which has a monitoring device 23. The representation according to FIG. 3 shows the control and/or regulating device 11 that is used for controlling or regulating an electric machine 41. The control and/or regulating device 11 is assigned to a power section 51. An intermediate direct current circuit can be connected by means of the power section 51, with the electric machine 41 being powered by means of a three-phase alternating current supply 37. The electric machine 41 is provided for moving a weight 47, with the weight 47 hanging via a cable 45 from a cable drum 43. The cable drum 43 is connected via a drive shaft 49 to the electric machine 41. The rotation of the electric machine 41 is monitored via both the second sensor 7 and the first sensor 3. Monitoring is necessary in particular because the first sensor 3 is linked via a coupling 15 to the electric machine 41. The first sensor 3 and second sensor 7 are both linked via a data cable 33, 34 to the control and/or regulating device 11, with a signal processing device 13 being integrated inside the control and/or regulating device 11 by means of which the first sensor 3 can be monitored by the second sensor 7.

In an embodiment variant in which, as shown in FIG. 1, the first sensor 3 and second sensor 7 are integrated inside a common sensor housing 8 there is the advantage that a separate second sensor will not have to be additionally mounted so that fault sources will be reduced thereby. It is furthermore unnecessary according to an embodiment variant of said kind for any rotational or linear means to be provided by a user of the monitoring method or monitoring device 11 for the second sensor 7 for scanning purposes. A further advantage of the integration inside one sensor housing 8 is that a high degree of protection can be realized in a simple manner or that no additional connecting means will need to be kept ready.

The invention claimed is:

1. A monitoring device for a drive device, wherein the monitoring device is provided for monitoring a movement of the drive device, comprising:
   a first sensor, wherein the first sensor is mechanically coupled to a motor shaft of a drive device via a coupling, wherein the coupling has a driving side and a driven side, and wherein the first sensor is assigned to the driven side of the coupling; and
   a second sensor, wherein the first sensor is monitored based upon the second sensor, and wherein the second sensor is assigned to the driving side of the coupling,
   wherein both sensors detect movements of the drive device, wherein a rotational movement of the driven side of the coupling is registered by the first sensor and wherein a rotational movement of the driving side of the coupling is registered by the second sensor,
   wherein the second sensor has a data link to the first sensor,
   wherein a sensor signal of the first sensor is evaluated with reference to a sensor signal of the second sensor in a signal processing device, and
   wherein the signal processing device is connected to a control device in order to transmit a fault signal to the control device when a differential of the sensor signals of the first and second sensors exceeds a threshold.

2. The monitoring device as claimed in claim 1, wherein the first sensor has a sensor disk, and wherein the sensor disk is linked to a sensor shaft having a fame-fit connection.

3. The monitoring device as claimed in claim 1, wherein a sensor signal output by the first sensor has a greater accuracy than a sensor signal output by the second sensor.

4. The monitoring device as claimed in claim 1, wherein the driving side of the coupling is linked to the motor shaft based upon a form-fit connection.

5. The monitoring device as claimed in claim 1, wherein the first sensor and the second sensor have a common sensor housing.

\* \* \* \* \*